United States Patent
Li et al.

(10) Patent No.: US 9,565,661 B2
(45) Date of Patent: Feb. 7, 2017

(54) METHODS AND APPARATUSES FOR SIGNALING RADIO BEARER TRANSMISSION IN A HETEROGENOUS NETWORK

(71) Applicant: Nokia Technologies Oy, Espoo (FI)

(72) Inventors: Haitao Li, Beijing (CN); Yang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/421,888

(22) PCT Filed: Sep. 26, 2012

(86) PCT No.: PCT/CN2012/082008
§ 371 (c)(1),
(2) Date: Feb. 16, 2015

(87) PCT Pub. No.: WO2014/047806
PCT Pub. Date: Apr. 3, 2014

(65) Prior Publication Data
US 2015/0223221 A1    Aug. 6, 2015

(51) Int. Cl.
H04W 72/04    (2009.01)
H04W 76/02    (2009.01)
(Continued)

(52) U.S. Cl.
CPC ....... *H04W 72/0406* (2013.01); *H04W 72/042* (2013.01); *H04W 72/0413* (2013.01);
(Continued)

(58) Field of Classification Search
CPC ................. H04W 72/0406; H04W 72/0413; H04W 72/042; H04W 76/022; H04W 76/026; H04W 84/042; H04W 84/12
See application file for complete search history.

(56) References Cited

U.S. PATENT DOCUMENTS

2011/0176531 A1* 7/2011 Rune ................... H04W 76/041
370/338
2012/0182912 A1    7/2012 Watfa et al.
(Continued)

FOREIGN PATENT DOCUMENTS

CN    102123411    7/2011
CN    102625260    8/2012
(Continued)

OTHER PUBLICATIONS

International Search Report and Written Opinion received for corresponding Patent Cooperation Treaty Application No. PCT/CN2012/082008, dated Jul. 4, 2013, 12 pages.

*Primary Examiner* — Awet Haile
(74) *Attorney, Agent, or Firm* — Mintz Levin Cohn Ferris Glovsky and Popeo, P.C.

(57) ABSTRACT

Methods, corresponding apparatuses, and computer program products for signaling radio bearer transmission in a heterogeneous network are provided. The method comprises performing, by a user equipment, as least one of the following: a local area radio resource control connection procedure with a local area base station over a local area specific signaling radio bearer; and a wide area radio resource control connection procedure with a wide area base station over a wide area specific signaling radio bearer via the local area base station. With the claimed inventions, the transmission of the specific signaling radio bearer (e.g., SRBO) in the heterogeneous network can be efficiently managed and implemented.

18 Claims, 5 Drawing Sheets

(51) Int. Cl.
 H04W 84/04 (2009.01)
 H04W 84/12 (2009.01)
(52) U.S. Cl.
 CPC ........ H04W 76/022 (2013.01); *H04W 76/026* (2013.01); *H04W 84/042* (2013.01); *H04W 84/12* (2013.01)

(56) References Cited

U.S. PATENT DOCUMENTS

2013/0137469 A1* 5/2013 Schmidt .............. H04W 74/006
 455/466
2013/0322270 A1* 12/2013 Ko ........................ H04L 45/304
 370/252

FOREIGN PATENT DOCUMENTS

| | | |
|---|---|---|
| CN | 102651867 | 8/2012 |
| WO | 2012021357 | 2/2012 |

\* cited by examiner

| Local message type | Transaction ID | IEs |

METHODS AND APPARATUSES FOR SIGNALING RADIO BEARER TRANSMISSION IN A HETEROGENOUS NETWORK

RELATED APPLICATION

This application was originally filed as PCT Application No. PCT/CN2012/082008 filed Sep. 26, 2012.

FIELD OF THE INVENTION

Embodiments of the present invention generally relate to wireless communication techniques including the 3GPP (the 3rd Generation Partnership Project) LTE (Long Term Evolution) technique. More particularly, embodiments of the present invention relate to methods, apparatuses, and computer program products for signaling radio bearer transmission in a heterogeneous network.

BACKGROUND OF THE INVENTION

Various abbreviations that appear in the specification and/or in the drawing figures are defined as below:
AM Acknowledged Mode
AP Access Point
BS Base Station
CN Core Network
CCCH Common Control Channel
DL Downlink
eLAN enhanced Local Area Network
eNB evolved Node B
EPS Enhanced Packet System
EPC Enhanced Packet Core
EUTRAN Evolved Universal Terrestrial Radio Access Network
GPRS General Packet Radio Service
GW Gateway
HLR Home Location Register
HSS Home Subscriber Server
IP Internet Protocol
LAN Local Area Network
LCP Logical Channel Prioritization
Layer 1 L1
Layer 2 L2
MAC Media Access Control
MME Mobility Management Entity
MSC Mobile Switching Centre
NAS Non Access Stratum
NB Node B
OAM Operations, Administrations and Maintenance
PDCP Packet Data Convergence Protocol
PDU Protocol Data Unit
PDN Packet Data Network
PHY Physical
PLMNID Public Land Mobile Network Identification
RLC Radio Link Control
RNC Radio Network Controller
RRC Radio Resource Control
RRM Radio Resource Management
SDU Service Data Unit
TM Transparent Mode
UE User Equipment
UL Uplink
UM Unacknowledged Mode
VLR Visitor Location Register
WAN Wide Area Network The following description of background art may include insights, discoveries, understandings or disclosures, or associations together with disclosures not known to the relevant art prior to the present invention but provided by the present invention. Some such contributions of the present invention may be specifically pointed out below, while other such contributions of the present invention will be apparent from their context.

As the number of persons using wireless communication in their daily life keeps increasing, high-speed data transmissions have become highly expected to meet the requirements of a multitude of wireless services. It is known that a LAN system is generally capable of providing relatively high speed data services. How to provide local access with a high speed data rate using a wireless communication system, e.g., an LTE system or an EPS, has become a hot topic in the 3GPP. This kind of local access may either compete with or complement other wireless local access techniques.

SUMMARY OF THE INVENTION

The following presents a simplified summary of the present invention in order to provide a basic understanding of some aspects of the present invention. It should be noted that this summary is not an extensive overview of the present invention and that it is not intended to identify key/critical elements of the present invention or to delineate the scope of the present invention. Its sole purpose is to present some concepts of the present invention in a simplified form as a prelude to the more detailed description that is presented later.

One embodiment of the present invention provides a method. The method comprises performing, by a UE, at least one of the following: a local area RRC connection procedure with a local area BS over a local area specific SRB; and a wide area RRC connection procedure with a wide area BS over a wide area specific SRB via the local area BS.

In one embodiment, the method further comprises encapsulating, prior to the local area RRC connection procedure, a local area RRC message into the local area specific SRB and encapsulating, prior to the wide area RRC connection procedure, a wide area RRC message into the wide area specific SRB.

In an additional embodiment, wherein the local area RRC message is signaled over a local UL CCCH.

In another embodiment, the method further comprises including into the local area specific SRB a message type field indicative of the local area RRC message being a local UL CCCH type message.

In yet another embodiment, wherein the local area RRC connection procedure comprises a local area RRC connection establishment or reestablishment procedure, and the wide area RRC connection procedure comprises a wide area RRC connection establishment or reestablishment procedure.

In a further embodiment, wherein the local area BS is an LTE LAN AP and the wide area BS is a macro eNB, the local area specific SRB is a local area SRB0, and the wide area specific SRB is a wide area SRB0.

Another embodiment of the present invention provides a method. The method comprises performing, by a local area BS, as least one of the following: a local area RRC connection procedure with a UE over a local area specific SRB and forwarding between the UE and a wide area BS a wide area RRC message over a wide area specific SRB for establishing a wide area RRC connection between the wide area BS and the UE.

In one embodiment, the method further comprises encapsulating, prior to the local area RRC connection procedure, a local area RRC message into the local area specific SRB.

In an additional embodiment, wherein the local area RRC message is signaled over a local DL CCCH.

In another embodiment, the method further comprises including into the local area specific SRB a message type field indicative of the local area RRC message being a local DL CCCH type message.

In yet another embodiment, wherein the local area RRC connection procedure comprises a local area RRC connection establishment or reestablishment procedure, and the wide area RRC connection procedure comprises a wide area RRC connection establishment or reestablishment procedure.

In a further embodiment, wherein the local area BS is an LTE LAN AP and the wide area BS is a macro eNB, and the local area specific SRB is a local area SRB0, and the wide area specific SRB is a wide area SRB0.

One embodiment of the present invention provides an apparatus. The apparatus comprises at least one of the following: means for performing, by a UE, a local area RRC connection procedure with a local area BS over a local area specific SRB and means for performing, by a UE, a wide area RRC connection procedure with a wide area BS over a wide area specific SRB via the local area BS.

Another embodiment of the present invention provides an apparatus. The apparatus comprises at least one of the following: means for performing, by a local area BS, a local area RRC connection procedure with a UE over a local area specific SRB and means for performing, by a local area BS, forwarding between the UE and a wide area BS a wide area RRC message over a wide area specific SRB for establishing a wide area RRC connection between the wide area BS and the UE.

A further embodiment of the present invention provides an apparatus. The apparatus comprises at least one processor and at least one memory including computer program instructions. The at least one memory and computer program instructions are configured to, with the at least one processor, cause the apparatus at least to perform at least one of the following: a local area RRC connection procedure with a local area BS over a local area specific SRB and a wide area RRC connection procedure with a wide area BS over a wide area specific SRB via the local area BS.

An additional embodiment of the present invention provides an apparatus. The apparatus comprises at least one processor and at least one memory including computer program instructions. The at least one memory and computer program instructions are configured to, with the at least one processor, cause the apparatus at least to perform at least one of the following: a local area RRC connection procedure with a UE over a local area specific SRB and forwarding between the UE and a wide area BS a wide area RRC message over a wide area specific SRB for establishing a wide area RRC connection between the wide area BS and the UE.

One embodiment of the present invention provides a computer program product, comprising at least one computer readable storage medium having a computer readable program code portion stored thereon. The computer readable program code portion comprises at least one of the following: program code instructions for performing, by a UE, a local area RRC connection procedure with a local area BS over a local area specific SRB and program code instructions for performing, by a UE, a wide area RRC connection procedure with a wide area BS over a wide area specific SRB via the local area BS.

One embodiment of the present invention provides a computer program product, comprising at least one computer readable storage medium having a computer readable program code portion stored thereon. The computer readable program code portion comprises at least one of the following: program code instructions for performing, by a local area BS, a local area RRC connection procedure with a UE over a local area specific SRB and program code instructions for performing, by a local area BS, forwarding between the UE and a wide area BS a wide area RRC message over a wide area specific SRB for establishing a wide area RRC connection between the wide area BS and the UE.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION OF EMBODIMENTS

While the making and using of various embodiments of the present invention are discussed in detail below, it should be appreciated that the present invention provides many applicable inventive aspects that can be embodied in a wide variety of specific contexts. The specific embodiments discussed herein are merely illustrative of specific ways to make and use the invention and do not delimit the scope of the invention.

To facilitate the understanding of embodiments of the present invention, a number of terms are defined below. Terms defined herein have meanings as commonly understood by a person of ordinary skill in the areas relevant to the present invention. Terms such as "a," "an" and "the" are not intended to refer to only a singular entity, but include the general class of which a specific example may be used for illustration. The terminology herein is used to describe specific embodiments of the present invention, but their usage does not delimit the invention. For example, a BS in the present invention may refer to one of a NB, an eNB, a base transceiver station, a radio BS, and the like and thus they may be used interchangeably throughout the specification and claims as appropriate.

An LTE-LAN (may also referred to as eLAN or eLA) technique is a heterogeneous network technique that can be used in a network consisting of an EPS network comprising macro/micro/pico BSs and a LAN comprising wireless APs. In such a heterogeneous network, a UE may have EPS and eLAN connectivity separately or concurrently. In this manner, the eLAN may provide high performance services for wireless communication users with relatively low costs. For example, the UE may have EPS bearer, offloaded EPS bearer and eLAN bearer services. For a better understanding of embodiments of the present invention, below is an introduction regarding this heterogeneous network with reference to FIG. 1.

Figure 1:
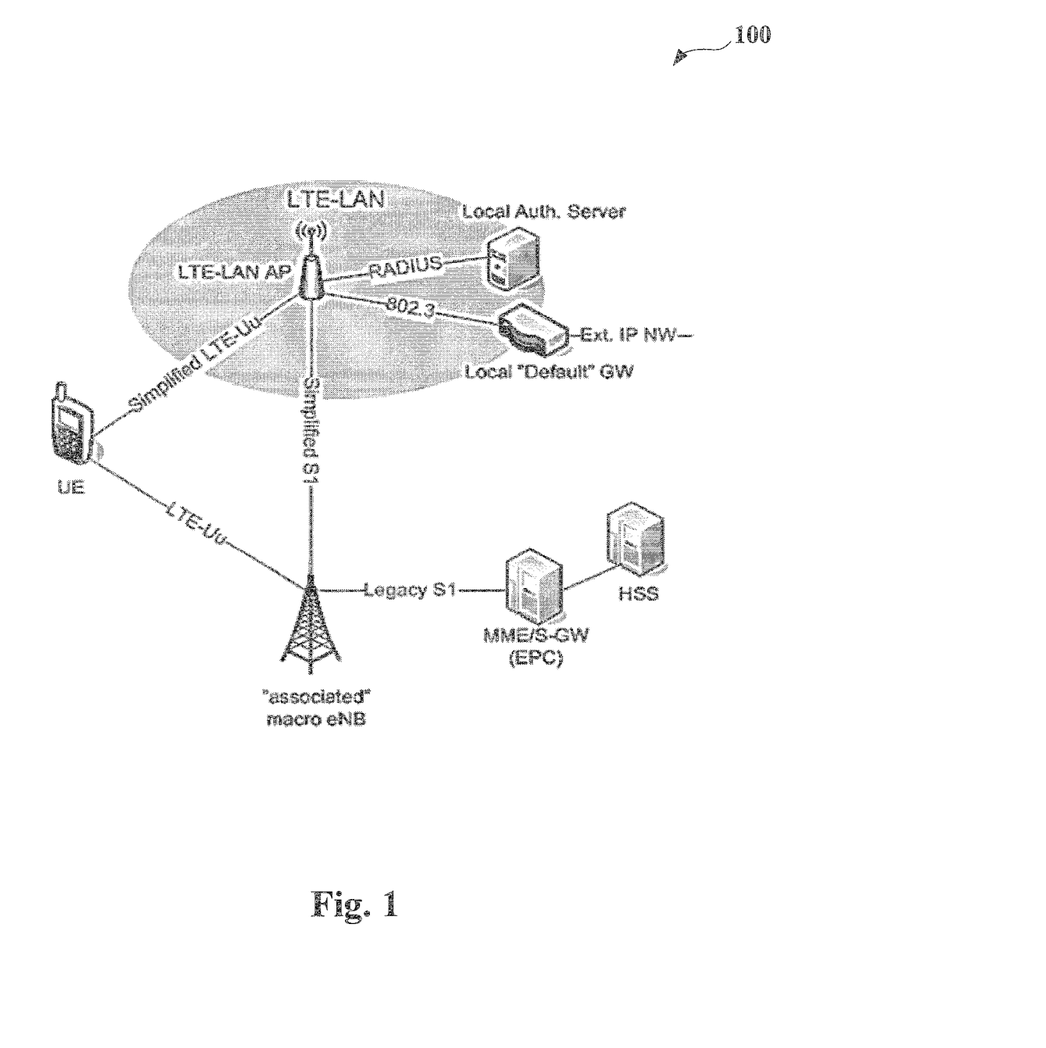
FIG. 1 illustrates an exemplary heterogeneous network including an LTE-LAN network and a legacy LTE or EPS network in which the embodiments of the present invention may be practiced.

FIG. 1 illustrates an exemplary heterogeneous network 100 including an LTE-LAN, in which exemplary network entities and interfaces between these entities are illustrated and embodiments of the present application can be practiced. As shown in FIG. 1, the LTE-LAN applies a new LTE-like radio interface as a "simplified LTE-Uu" interface between the UE and LTE-LAN AP. Due to requirement for less CN involvement, the LTE-LAN network according to certain embodiments of the present invention supports a "stand-alone" mode where the LTE-LAN network is working autonomously by providing a basic wireless broadband access with UE traffic routing to a local LAN/IP network directly from an LTE-LAN AP (a specific kind of a local area BS in the present invention) and to the Internet via a default GW of this LAN/IP network. This autonomous "stand-alone" mode operation is useful especially in the case where overlaying macro network service (also termed a wide area service relative to a local area service in the present invention) coverage, e.g., provided by an "associated" macro eNB (also termed a wide area BS in the present invention) as illustrated in FIG. 1, is missing or has poor quality or poor capabilities relative to what the service would need. The local LAN transport network may include an ordinary Ethernet-based LAN, i.e. IEEE 802.3 or any of its modern extensions like Gigabit-Ethernet, as shown in FIG. 1. In general, this stand-alone LTE-LAN operation resembles existing Wi-Fi network solutions except that the radio interface is using said simplified LTE-Uu interface with LTE procedures. The LTE local radio would use an LTE physical layer or any of its extensions (e.g., LTE-Advanced) and LTE protocols with possible simplifications compared to a WAN. The LTE-LAN may additionally include new features specifically designed for the local wireless access.

For the autonomous stand-alone mode operation as discussed above, the LTE-LAN network provides means for UE authentication and authorization to use services provided by the LTE-LAN network. This may be implemented by using similar methods as applied in WLAN (IEEE 802.11i) but modified to carry the authentication protocol messages, e.g. EAP encapsulated into LTE Uu RRC messages. In FIG. 1, there is shown an optional local authentication server that may be a RADIUS server or a diameter server like the one used in enterprise Wi-Fi networks.

The above means might be advantageous since such autonomous (local area) operations to a mobile CN may enable LTE-LAN local access services deployment and operation either by a different mobile operator than the macro eNB, or a local access network operator (third party), where the usage of LTE-LAN network locally supported services may be kept transparent to the CN for simplicity and for lightening signaling load exposed to the CN.

However, a problem may arise during signaling transmissions when the UE is in a single radio mode in which the UE may only communicate with the "associated" macro eNB via the LTE-LAN AP rather than communicating directly with the macro eNB and indirectly therewith via the LTE-LAN AP simultaneously, i.e., in a dual radio mode. Below are discussions with respect to the problem.

In the current LTE system (see TS 36.331, chapter 4.2.2, which is incorporated herein by reference in its entirety), there are three types of SRBs between a UE and a macro eNB, i.e., SRB0, SRB1 and SRB2, wherein:

SRB0 is for RRC messages using the CCCH;

SRB1 is for RRC messages (which may include a piggybacked NAS message) as well as for NAS messages prior to the establishment of SRB2, all using the DCCH; and SRB2 is for RRC messages which include logged measurement information as well as for NAS messages, all using the DCCH. SRB2 has a lower priority than SRB1 and is always configured by E-UTRAN after security activation.

Based upon the above specification, the eNB and UE will use different SRBs for different RRC messages based upon the information included therein. For example, when an RRCConnectionRequest message is sent on the CCCH and there is no security concern for this message, the RRCConnectionRequest message would use SRB0 for transmission. Again, when an RRCConnectionReconfiguration message is sent from the eNB to the UE on the DCCH, it is ciphered and integrity protected at a PDCP layer (e.g., one illustrated in FIG. 2) and should use SRB1 for transmission. Additionally, when an ULInformationTransfer message containing NAS PDU(s) is sent on the DCCH and ciphered based upon related NAS layer security keys, it should use SRB2 for transmission.

Although the above specification with respect to the use of SRBs may be efficiently applied in the LTE system, it could be inconvenient to the LTE-LAN system when the UE is in the single radio mode as discussed above. In particular, due to potentially independent deployment of the LTE-LAN AP and macro eNB, how to efficiently manage and implement SRB transmission, especially SRB0 transmission, for both local and EPS networks has not yet been solved.

To address the above problem, certain embodiments of the present invention would provide for an efficient way of transmitting RRC messages using SRB0 such that the RRC connections, which are established or reestablished using SRB0 between the UE and the LTE-LAN AP and between the UE and the macro eNB via the LTE-LAN AP, could be performed properly and efficiently.

Specifically, certain embodiments of the present invention attend to SRB0 transmission based upon a flat RRC protocol stack for LTE-LAN networks, as exemplarily illustrated in FIG. 2 and will be discussed in detail later. According to the embodiments of the present invention, two SRB0 have been defined with one for a local RRC connection and the other for an EPS RRC connection. More particularly, the local RRC connection (re)establishment between the UE and AP could be done directly via a local SRB0, and the EPS RRC connection (re)establishment between the UE and the associated macro eNB could be done via an EPS SRB0.

With respect to the local RRC connection, a local domain SRB0 (i.e., a local SRB0) would be used to encapsulate the local RRC connection message and transmitted between a local RRC entity in the UE and a local RRC entity in the AP.

Further, it is proposed that two new message types be introduced to further distinguish the local SRB0. For example, for a local DL SRB0 transmission, a local DL CCCH message type can be defined. Likewise, for a local UL SRB0 transmission, a local UL CCCH message type can be defined. In this manner, the UE and AP could identify if the received SRB0 is for a local RRC signaling or an EPS RRC signaling. With respect to the EPS RRC connection, due to the single radio mode as discussed previously, the AP may forward the EPS domain SRB0 (i.e., EPS SRB0) from the UE to the EPS RRC entity in the associated eNB. Hereinafter, the embodiments of the present invention would be discussed in more detail in connection with FIGS. 2-7.

Figure 2:
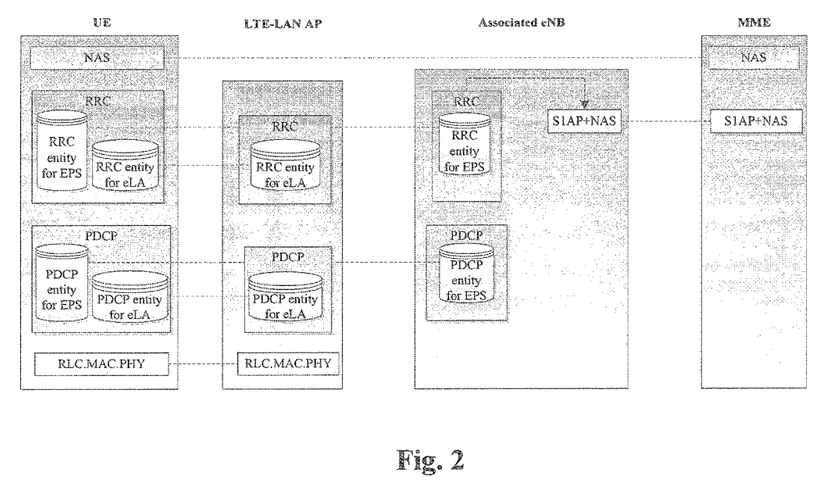
FIG. 2 schematically illustrates a flat C-plane protocol stack for the heterogeneous network as illustrated in FIG. 1.

FIG. 2 schematically illustrates a flat C-plane protocol stack for the heterogeneous network as illustrated in FIG. 1. As illustrated in FIG. 2, except for a NAS protocol layer, the UE and the LAN-AP may have, from the upper layers to the lower layers, their respect RRC, PDCP, RLC, MAC, and PHY protocol layers. With respect to the NAS protocol layer, the signaling messages between the UE and the macro LTE network are passed transparently via the LTE-LAN system in a similar manner as e.g., NAS messages are passed from the UE to the MME encapsulated in ciphered NAS containers.

Among these protocol layers between the UE and the LAN-AP, the RRC protocol layer may be in charge of the connection control, measurement configuration, and system information broadcasting; the PDCP protocol layer may be responsible for security handling, i.e., integrity protection/ check and ciphering/de-ciphering, and also header compression for SRBs; and RLC protocol layer may form an appropriate RLC PDU suitable for transmission by the segmentation and concatenation functions of an RLC SDU received from the PDCP protocol layer and include a plurality of RLC entities which may be in one of the TM, UM and AM as configured. Handling within the MAC and PHY protocol layers below the RLC protocol layer is substantially the same for transmission of an EPS RRC message between the UE and associated eNB and for transmission of a local RRC message between the UE and LTE-LAN AP. Except for SRB0, which is specified not to be subject to the handling of the PDCP protocol layer, the RRC message generated in the RRC protocol layer will be encapsulated in an SRB and then secured in the PDCP protocol layer according to the security requirement of this message. For example, the EPS RRC messages (i.e., wide area signaling messages) will be secured based upon EPS security keys in a PDCP entity included in the PDCP protocol layer. In contrast, the LAN RRC messages will be secured based upon local security mechanisms employed in a separate PDCP entity, subjected to the processing of an AM RLC entity and then delivered to the MAC and PHY protocol layers.

As seen from the FIG. 2, this flat RRC stack for the LTE-LAN network may establish separate RRC entities within one RRC layer of UE, that is, an RRC entity for EPS services and an RRC entity for eLA(N) services, which can be referred to as an EPS RRC entity and a Local RRC entity, respectively, wherein the Local RRC entity located in the UE is capable of transmitting/receiving local RRC signaling to/from the counterpart RRC entity located in the AP, secured by a local security mechanism when the local RRC signaling is not encapsulated over the local SRB0, and the EPS RRC entity located in the UE is capable of transmitting/ receiving EPS RRC signaling to/from the counterpart RRC entity located in associated eNB, secured by EPS security mechanism when the EPS RRC signaling is not encapsulated over the EPS SRB0. Because only a single RRC layer is implemented, this protocol arrangement would be very well compatible with the legacy UE. Likewise, legacy mapping from RRC messages to logical channels could be maintained and LCP between the EPS RRC messages and local RRC messages may occur in lower layers. Simply put, the flat RRC stack as illustrated in FIG. 2 and employed by the embodiments of the present invention implies tighter coupling between the local network and EPS network and introduces less changes in L1 and L2 techniques.

Figure 3:
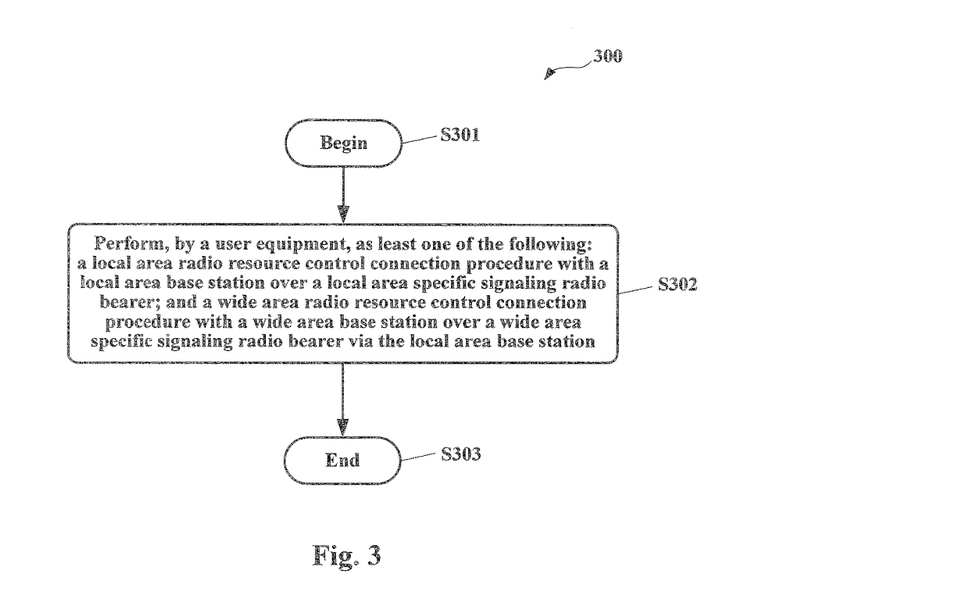
FIG. 3 is a flow chart schematically illustrating a method for transmission of a specific SRB (e.g., SRB0) from a UE's perspective according to an embodiment of the present invention.

FIG. 3 is a flow chart schematically illustrating a method 300 for transmission of a specific SRB from a UE's perspective according to an embodiment of the present invention. As illustrated in FIG. 3, the method 300 begins at step S301 and proceeds to step S302, at which the method 300 performs, by a UE, as least one of the following: a local area RRC connection procedure with a local area BS over a local area specific SRB; and a wide area RRC connection procedure with a wide area BS over a wide area specific SRB via the local area BS. It should be noted that the term "specific SRB" in this specification may refer to the SRB0 in the LTE or UMTS system and may further refer to any other SRBs that may be developed in any future wireless systems and that may implement the same or similar functionality of the SRB0. Thus, the SRB0 is merely an example of the specific SRB and should not be used to limit the scope of the embodiments of the present invention in any respect. In the following, for a purpose of easy discussions, the specific SRB and SRB0 may be used interchangeably where necessary.

The performance of at least one of the local area RRC connection procedure and the wide area RRC connection procedure may be dependent upon the UE's demands in relation to the local service or EPS service. For example, if the UE would like to "consume" local services, it may initiate a local RRC connection with the serving AP over a local SRB0. Likewise, if the UE requests wide area services (e.g., EPS services), it may initiate an EPS RRC connection with an associated eNB over a wide area SRB0 (e.g., EPS SRB0). Of course, the above performance of the local area RRC connection or the wide area RRC connection procedure may equally be established by the local area BS (e.g., an LTE-LAN AP) or the wide area BS (e.g., an associated eNB). Finally, the method 300 ends at step S303.

Although not shown in FIG. 3, in one embodiment, the method 300 further comprises encapsulating, prior to the local area RRC connection procedure, a local area RRC message into the local area specific SRB and encapsulating, prior to the wide area RRC connection procedure, a wide area RRC message into the wide area specific SRB. In another embodiment, the local area RRC message is signaled over a local UL CCCH channel. In an additional embodiment, the method 300 further comprises including into the local area specific SRB a message type field indicative of the local area RRC message being a local UL CCCH type message, as will be discussed in connection with FIG. 6.

In yet another embodiment, the local area RRC connection procedure comprises a local area RRC connection establishment or reestablishment procedure, and the wide area RRC connection procedure comprises a wide area RRC connection establishment or reestablishment procedure. In a further embodiment, the local area BS is an LTE LAN AP, the wide area BS is a macro eNB, the local area specific SRB is a local area SRB0 and the wide area specific SRB is a wide area SRB0 (e.g., EPS SRB0).

Based upon the method 300 as performed by the UE, transmission of the specific SRB (e.g., SRB0) under the flat RRC stack as illustrated in FIG. 2 would be efficiently implemented. Thereby, the UE or local area BS may operate in a highly-efficient manner in the LTE-LAN network.

Figure 4:
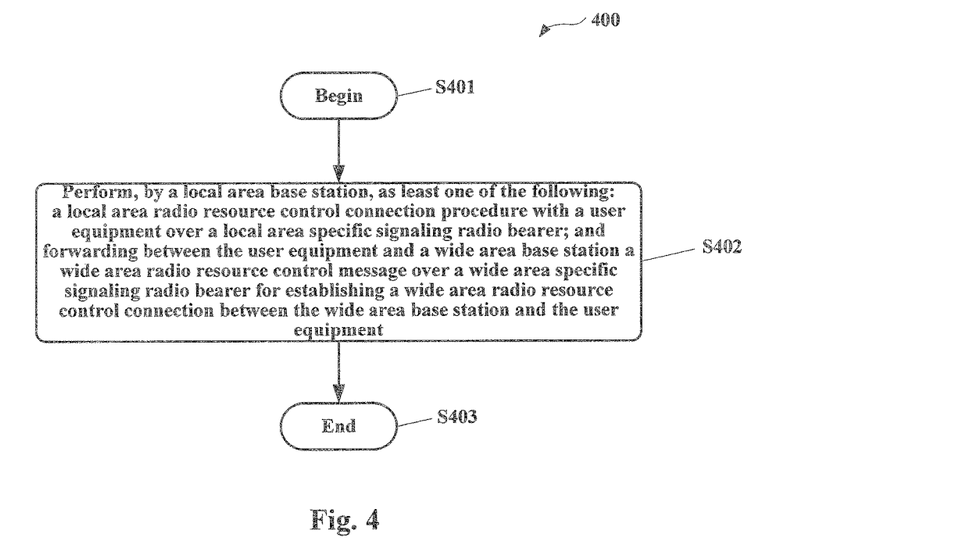
FIG. 4 is a flow chart schematically illustrating a method for transmission of a specific SRB (e.g., SRB0) from a local area BS (e.g., an LTE-LAN AP) according to an embodiment of the present invention.

FIG. 4 is a flow chart schematically illustrating a method 400 for transmission of a specific SRB (e.g., SRB0) from a local area BS (e.g., an LTE-LAN AP) according to an embodiment of the present invention. As illustrated in FIG. 4, the method 400 begins at step S401 and advances to step S402, at which the method 400 performs, by a local area BS, as least one of the following: a local area RRC connection procedure with a UE over a local area specific SRB and forwarding between the UE and a wide area BS a wide area RRC message over a wide area specific SRB for establishing a wide area RRC connection between the wide area BS and the UE.

Although not shown in FIG. 4, in one embodiment, the method 400 further comprises encapsulating, prior to the local area RRC connection procedure, a local area RRC message into the local area specific SRB. In another embodiment, the local area RRC message is signaled over a local DL CCCH channel. In an additional embodiment, the method 400 further comprises including into the local area specific SRB a message type field indicative of the local area RRC message being a local DL CCCH type message, as will be discussed in connection with FIG. 6.

In yet another embodiment, the local area RRC connection procedure comprises a local area RRC connection establishment or reestablishment procedure, and the wide area RRC connection procedure comprises a wide area RRC connection establishment or reestablishment procedure. In a further embodiment, the local area BS is an LTE LAN AP and the wide area BS is a macro eNB, the local area specific SRB is a local area SRB 0 and the wide area specific SRB is a wide area SRB0 (e.g., an EPS SRB0).

By means of the method 400 as performed by the local area BS, SRB0 transmission under the flat RRC protocol stack as illustrated in FIG. 2 would be efficiently implemented. Furthermore, the local area SRB0 and wide area SRB0 transmission would be distinguished at the local area BS and properly handled.

Figure 5:
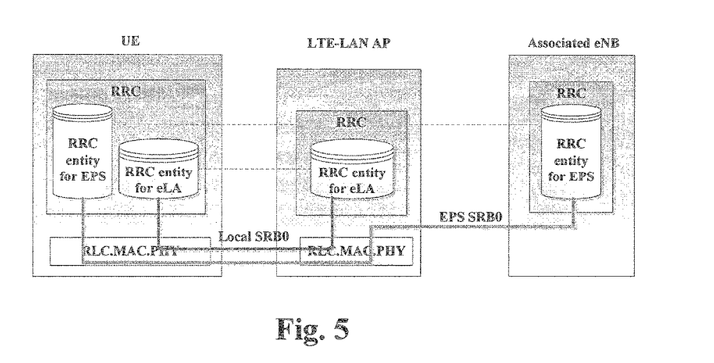
FIG. 5 schematically illustrates transmission of a local area SRB0 and a wide area SRB0 following the flat C-plane protocol stack as illustrated in FIG. 2 according to an embodiment of the present invention.

FIG. 5 schematically illustrates transmission of a local area SRB0 and a wide area SRB0 (e.g., EPS SRB0) on the flat C-plane protocol stack as illustrated in FIG. 2 according to an embodiment of the present invention. As discussed before, for local RRC messages (e.g., associated with local domain connection (re)establishment messages on the CCCH channel) and EPS RRC messages (e.g., associated with EPS domain connection (re)establishment messages on the CCCH channel) transmission, two SRB0 are defined based on the flat RRC protocol stack according to the embodiments of the present invention, i.e., a local SRB0 and an EPS SRB0, whose transmission links are exemplarily depicted by lines in FIG. 5. As seen from FIG. 5, the local SRB0 transmission link can be established between an RRC entity for eLA at the UE and a counterpart RRC entity for eLA at the AR Further, the EPS SRB0 transmission link can be established between an RRC entity for EPS at the UE and a counterpart RRC entity for EPS at the associated eNB. Different from the local SRB0 transmission, the EPS SRB0 transmission cannot be established directly between the UE and the associated eNB but rather rely upon the relay of the AP. It is to be understood that the local SRB0 terminates at the LTE-LAN AP side while the EPS SRB0 terminates at the associated eNB side. It is also to be understood that the SRB0 transmission, due to its characteristic as mentioned before, does not involve any PDCP association and security protection and thus no PDCP layer is depicted in FIG. 5.

Figure 6:
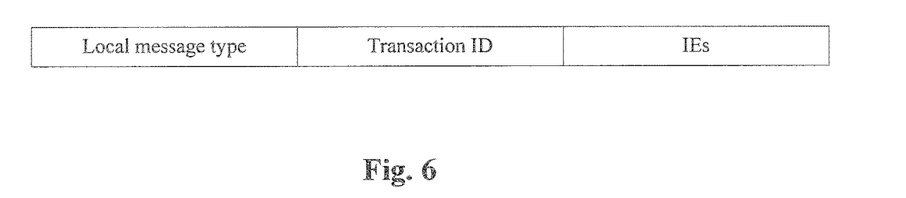
FIG. 6 schematically illustrates a new field of a local RRC message encapsulated in a local SRB0 according to another embodiment of the present invention.

As also seen from FIG. 5, a common part of these two SRB0 transmission paths is that they share the same lower layer (RLC/MAC/PHY) transmission over LTE-LAN Uu interface for the case of single radio mode transmission. Due to this, it needs to distinguish different UL RRC messages at the LTE-LAN AP side so as to decide to forward which RLC SDU to which RRC entity (either the local RRC entity in the AP or the EPS RRC entity in the associated eNB). The same case also takes places at the UE side, that is, for DL RRC messages received by the RLC layer, the UE should identify which RRC entity this RRC message belongs to. For a differentiation purpose, two new message types are introduced according to the embodiments of the present invention, i.e., a Local-DL-CCCH-MessageType and a Local-UL-CCCH-MessageType. Upon this introduction, for a local domain UL/DL SRB0 message, the local RRC entity at the UE/AP side would tag this message with the corresponding local message type information (or bit), i.e. Local-UL-CCCH-MessageType/Local-DL-CCCH-MessageType in a new message type field of the RRC message as shown in FIG. 6. This way, at the receiver side, after handled by the RLC layer, AP/UE can distinguish which domain this SRB0 message belongs to using the message type field and thus pass the message to the right RRC entity for interpretation. It can be understood that the embodiments of the present invention enable single LTE-LAN radio to support both the local and EPS services with the flat RRC protocol stack.

As just mentioned above, FIG. 6 schematically illustrates a new field of a RRC message encapsulated in a SRB0 according to another embodiment of the present invention. As illustrated in FIG. 6, in addition to the existing local transaction ID and other IEs fields, the embodiments of the present invention additionally include a new field of a local message type in an RRC message. By virtue of this type field, the AP and UE are able to determine a correct domain to which the received RRC messages belong and thus conduct corresponding operations.

Figure 7:
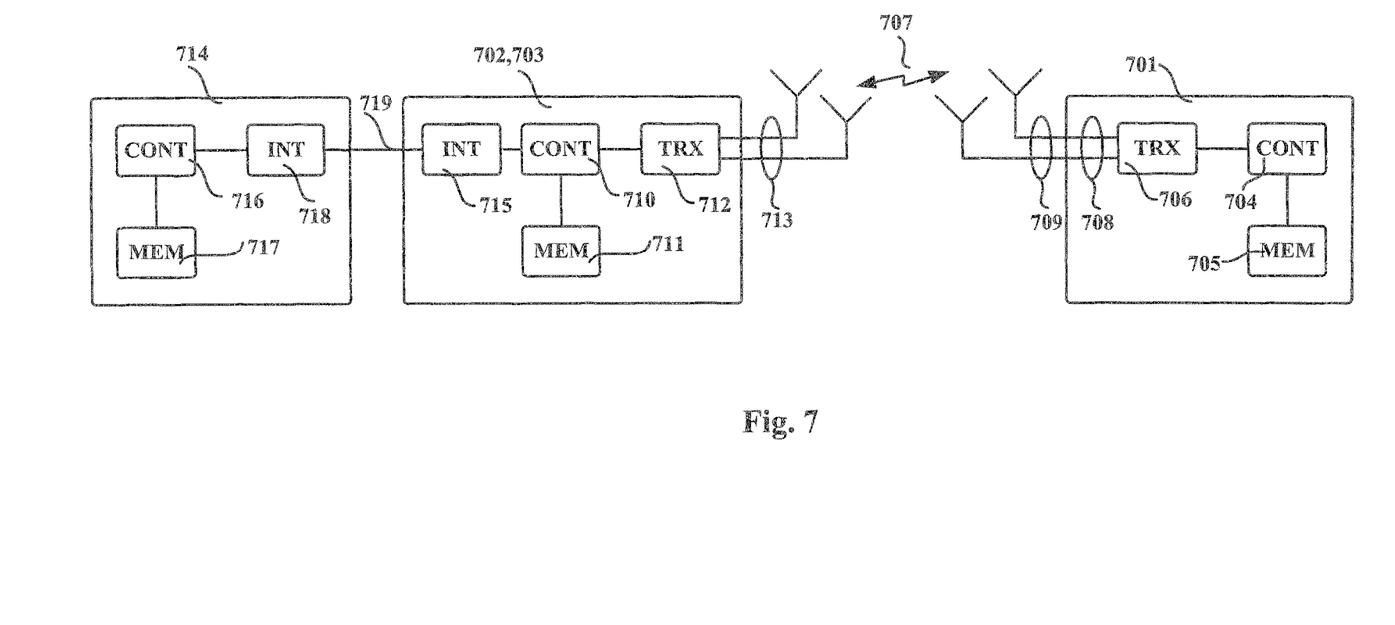
FIG. 7 is a simplified schematic block diagram illustrating apparatuses according to embodiments of the present invention.

FIG. 7 is a simplified schematic block diagram illustrating apparatuses according to an embodiment of the present invention. As illustrated in FIG. 7, a UE 701 is located in the coverage of a radio network node 702 or 703 and is configured to be in connection with the radio network node 702 or 703. The UE 701 comprises a controller 704 operationally connected to a memory 705 and a transceiver 706. The controller 704 controls the operation of the UE 701. The memory 705 is configured to store software and data. The transceiver 706 is configured to set up and maintain a wireless connection 707 to the radio network node 702 or 703. The transceiver 706 is operationally connected to a set of antenna ports 708 connected to an antenna arrangement 709. The antenna arrangement 709 may comprise a set of antennas. The number of antennas may be one to four, for example. The number of antennas is not limited to any particular number. The UE 701 may also comprise various other components, such as a user interface, camera, and media player. They are not displayed in the figure due to simplicity.

The radio network node 702 or 703, such as an LTE BS (or eNB) or LTE-LAN AP included in an eLAN, comprises a controller 710 operationally connected to a memory 711, and a transceiver 712. The controller 710 controls the operation of the radio network node 702 or 703. The memory 711 is configured to store software and data. The transceiver 712 is configured to set up and maintain a wireless connection to the UE 701 within the service area of the radio network node 702 or 703. The transceiver 712 is operationally connected to an antenna arrangement 713. The antenna arrangement 713 may comprise a set of antennas. The number of antennas may be two to four, for example. The number of antennas is not limited to any particular number. The radio network node 702 or 703 may be operationally connected (directly or indirectly) to another CN or LAN network element 714 of the communication system, such as an RNC, an MME, an MSC server (MSS), an MSC, an RRM node, a gateway GPRS support node, an OAM node, an HLR, a VLR, a serving GPRS support node, a GW, and/or a server, via an interface 715. The network node 714 comprises a controller 716 operationally connected to a memory 717, and an interface 718. The controller 716 controls the operation of the network node 714. The memory 717 is configured to store software and data. The interface 718 is configured to connect to the radio network node 702 or 703 via a connection 719. The embodiments are not, however, restricted to the network given above as an example, but a person skilled in the art may apply the solution to other communication networks provided with the necessary properties. For example, the connections between different network elements may be realized with IP connections.

Although the apparatus 701, 702, 703, or 714 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communication system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, a communicator, a tablet or a pad.

The apparatus 701, 702, 703, or 714 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 705, 711, or 717 may include volatile and/or non-volatile memory and typically stores content, data, or the like. For example, the memory 705, 711, or 717 may store computer program code such as software applications (for example for transmission of the local SRB0 between the UE and AP and the EPS SRB0 between the UE and associated eNB via the AP) or operating systems, information, data, content, or the like for a processor to perform steps associated with operation of the apparatus 701, 702, 703 or 714 in accordance with embodiments. The memory may be, for example, a random access memory (RAM), a hard drive, or other fixed data memories or storage devices. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
performing, by a user equipment, a local area radio resource control connection procedure with a local area base station over a local area specific signaling radio bearer, when the user equipment requires a service provided by the local area base station, wherein the service provided by the local area base station includes routing, to a wide area base station, at least one radio resource control message sent from the user equipment; and
performing, by the user equipment, a wide area radio resource control connection procedure with the wide area base station over a wide area specific signaling radio bearer, when the user equipment requires a service provided by the wide area base station, wherein the performing of the wide area radio resource control connection procedure includes transmitting, to the local area base station, the at least one radio resource control message for establishing or reestablishing a wide area radio connection with the wide area base station, and wherein the transmitting of the at least one radio resource control message to the local area base station enables the at least one radio resource control message to be routed, by the local area base station, to the wide area base station.

2. The method as recited in claim 1, further comprising:
encapsulating, prior to the local area radio resource control connection procedure, a local area radio resource control message into the local area specific signaling radio bearer; and
encapsulating, prior to the wide area radio resource control connection procedure, a wide area radio resource control message into the wide area specific signaling radio bearer.

3. The method as recited in claim 2, wherein the local area radio resource control message is signaled over a local uplink common control channel.

4. The method as recited in claim 3, further comprising:
including into the local area specific signaling radio bearer a message type field indicative of the local area radio resource control message being a local uplink common control channel type message.

5. The method as recited in claim 1, wherein the local area radio resource control connection procedure comprises a local area radio resource control connection establishment or reestablishment procedure, and the wide area radio resource control connection procedure comprises a wide area radio resource control connection establishment or reestablishment procedure.

6. The method as recited in claim 1, wherein the local area specific signaling radio bearer is a local area signaling radio bearer 0 and the wide area specific signaling radio bearer is a wide area signaling radio bearer 0.

7. An apparatus, comprising:
at least one processor; and
at least one memory including compute program instructions,
the at least one memory and computer program instructions are configured to, with the at least one processor, cause the apparatus to at least:
perform a local area radio resource control connection procedure with a local area base station over a local area specific signaling radio bearer, when the apparatus requires a service provided by the local area base station, wherein the service provided by the local area base station includes routing, to a wide area base station, at least one radio resource control message sent from the user equipment; and
perform a wide area radio resource control connection procedure with a wide area base station over a wide area specific signaling radio bearer, when the apparatus requires a service provided by the wide area base station, wherein the performing of the wide area radio resource control connection procedure includes transmitting, to the local area base station, at least one radio resource control message for establishing or reestablishing a wide area radio connection with the wide area base station, and wherein the transmitting of the at least one radio resource control message to the local area base station enables the at least one radio resource control message to be routed, by the local area base station, to the wide area base station.

8. The apparatus as recited in claim 7, wherein the apparatus is further configured to at least:
encapsulate, prior to the local area radio resource control connection procedure, a local area radio resource control message into the local area specific signaling radio bearer; and
encapsulate, prior to the wide area radio resource control connection procedure, a wide area radio resource control message into the wide area specific signaling radio bearer.

9. The apparatus as recited in claim 8, wherein the local area radio resource control message is signaled over a local uplink common control channel.

10. The apparatus as recited in claim 9, wherein the apparatus is further configured to at least:
include into the local area specific signaling radio bearer a message type field indicative of the local area radio resource control message being a local uplink common control channel type message.

11. The apparatus as recited in claim 7, wherein the local area radio resource control connection procedure comprises a local area radio resource control connection establishment or reestablishment procedure, and the wide area radio resource control connection procedure comprises a wide area radio resource control connection establishment or reestablishment procedure.

12. The apparatus as recited in claim 7, wherein the local area specific signaling radio bearer is a local area signaling radio bearer 0 and the wide area specific signaling radio bearer is a wide area signaling radio bearer 0.

13. A local area base station, comprising:
at least one processor; and
at least one memory including compute program instructions,
the at least one memory and computer program instructions are configured to, with the at least one processor, cause the local area base station to at least:
perform a local area radio resource control connection procedure with a user equipment over a local area specific signaling radio bearer, when the user equipment requires a service provided by the local area base station, wherein the service provided by the local area base station includes routing, to a wide area base station, at least one radio resource control message the local area base station receives from the user equipment; and
forward, to the wide area base station, the at least one radio resource control message for establishing or reestablishing a wide area radio resource control connection between the wide area base station and the user equipment, wherein the wide area radio resource control connection is established or reestablished when the user equipment requires a service provided by the wide area base station, wherein the at least one radio resource control message is forwarded over a wide area specific signaling radio bearer, and wherein the at least one radio resource control message is transmitted to the local area base station to enable the at least one radio resource control message to be routed, by the local area base station, to the wide area base station.

14. The local area base station as recited in claim 13, wherein the local area base station is further configured to at least:
encapsulate, prior to the local area radio resource control connection procedure, a local area radio resource control message into the local area specific signaling radio bearer.

15. The local area base station as recited in claim 14, wherein the local area radio resource control message is signaled over a local downlink common control channel.

16. The local area base station as recited in claim 15, wherein the local area base station is further configured to at least:
include, in the local area specific signaling radio bearer, a message type field indicative of the local area radio resource control message being a local downlink common control channel type message.

17. The local area base station as recited in claim 16, wherein the local area radio resource control connection procedure comprises a local area radio resource control connection establishment or reestablishment procedure, and the wide area radio resource control connection procedure comprises a wide area radio resource control connection establishment or reestablishment procedure.

18. The local area base station as recited in claim 13, wherein the local area specific signaling radio bearer is a local area signaling radio bearer 0 and the wide area specific signaling radio bearer is a wide area signaling radio bearer 0.

* * * * *